US007529557B2

(12) United States Patent
Farrill

(10) Patent No.: US 7,529,557 B2
(45) Date of Patent: May 5, 2009

(54) PRESS-TO-CONNECT FOR WIRELESS COMMUNICATIONS SYSTEMS

(75) Inventor: F. Craig Farrill, Danville, CA (US)

(73) Assignee: Kodiak Networks, Inc., San Ramon, CA (US)

( * ) Notice: Subject to any disclaimer, the term of this patent is extended or adjusted under 35 U.S.C. 154(b) by 495 days.

(21) Appl. No.: 11/158,527

(22) Filed: Jun. 22, 2005

(65) Prior Publication Data

US 2006/0019654 A1    Jan. 26, 2006

Related U.S. Application Data

(63) Continuation-in-part of application No. PCT/US2004/023038, filed on Jul. 16, 2004, and a continuation-in-part of application No. PCT/US03/16386, filed on May 23, 2003.

(60) Provisional application No. 60/581,954, filed on Jun. 22, 2004, provisional application No. 60/488,638, filed on Jul. 18, 2003, provisional application No. 60/492,650, filed on Aug. 5, 2003, provisional application No. 60/576,094, filed on Jun. 2, 2004, provisional application No. 60/382,981, filed on May 24, 2002, provisional application No. 60/383,179, filed on May 24, 2002, provisional application No. 60/407,168, filed on Aug. 30, 2002.

(51) Int. Cl.
*H04B 7/00*    (2006.01)
*H04Q 7/20*    (2006.01)

(52) U.S. Cl. .............. 455/518; 455/519; 455/426.1; 455/521; 455/512; 455/458; 370/259; 370/432; 379/158; 379/160; 379/190; 379/202.01

(58) Field of Classification Search ......... 455/516–519, 455/414.1, 426.1, 422.1, 407, 522, 512, 458, 455/445, 466, 416, 521; 379/157–162, 167.14, 379/171, 192, 190, 201.01, 201.1, 202.01, 379/207.01, 207.03, 265.08, 265.02; 370/335, 370/401, 259–261, 465, 432, 329, 342
See application file for complete search history.

(56) References Cited

U.S. PATENT DOCUMENTS 5,442,809 A * 8/1995 Diaz et al. .................. 455/511

(Continued)

FOREIGN PATENT DOCUMENTS

| WO | WO 00/79825 | 12/2000 |
| WO | WO05009006 | 12/2000 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner*—Sujatha Sharma
(74) *Attorney, Agent, or Firm*—Gates & Cooper LLP

(57) ABSTRACT

An advanced voice service known as "Press-to-Connect" for wireless communications systems. A real-time exchange interfaces to the wireless network to provide a Press-to-Connect (PTC) call between an initiator and one or more recipients, wherein the PTC call comprises a time-limited Press-to-Talk (P2T) call. The real-time exchange uses a Talk Timer to limit how long the user may press a button and talk (i.e., the Talk Timer limits the length of each continuous "Talk" session of the call), before a "Talk" session of the call in the wireless network is ended, and the real-time exchange uses a Call Timer to limit how long the call can last (i.e., the Call Timer limits the overall length of the call), before the call in the wireless network is ended.

16 Claims, 3 Drawing Sheets

U.S. PATENT DOCUMENTS

| | | | |
|---|---|---|---|
| 5,711,011 | A | 1/1998 | Urs et al. |
| 5,987,318 | A | 11/1999 | Alperovich et al. |
| 6,021,326 | A | 2/2000 | Nguyen |
| 6,138,011 | A | 10/2000 | Sanders, III et al. |
| 6,304,558 | B1 | 10/2001 | Mysore |
| 6,411,815 | B1 | 6/2002 | Balasuriya |
| 6,477,366 | B1 | 11/2002 | Valentine et al. |
| 6,661,878 | B1 | 12/2003 | Mirashrafi et al. |
| 6,751,468 | B1 * | 6/2004 | Heubel et al. ............... 455/518 |
| 6,895,254 | B2 * | 5/2005 | Dorenbosch ............... 455/518 |
| 2001/0005372 | A1 | 6/2001 | Cave et al. |
| 2002/0196781 | A1 | 12/2002 | Salovuori |
| 2003/0016632 | A1 | 1/2003 | Refai et al. |
| 2003/0078064 | A1 | 4/2003 | Chan |
| 2003/0153343 | A1 * | 8/2003 | Crockett et al. ............. 455/519 |
| 2003/0190888 | A1 | 10/2003 | Mangal et al. |
| 2004/0032843 | A1 * | 2/2004 | Schaefer et al. ............. 370/338 |
| 2004/0057449 | A1 | 3/2004 | Black |
| 2004/0259580 | A1 | 12/2004 | Florkey et al. |
| 2005/0202807 | A1 | 9/2005 | Ayyasamy et al. |
| 2005/0221819 | A1 | 10/2005 | Patel et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0019654 | A1 | 1/2006 | Farrill |
| 2006/0030347 | A1 | 2/2006 | Biswas |
| 2006/0116150 | A1 * | 6/2006 | Bhutiani ..................... 455/518 |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |

FOREIGN PATENT DOCUMENTS

| | | |
|---|---|---|
| WO | WO 03/101007 | 12/2003 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

* cited by examiner

PRESS-TO-CONNECT FOR WIRELESS COMMUNICATIONS SYSTEMS

CROSS REFERENCE TO RELATED APPLICATIONS

This application claims the benefit under 35 U.S.C. Section 119(e) of the following co-pending and commonly-assigned patent application:

U.S. Provisional Patent Application Ser. No. 60/581,954, filed Jun. 22, 2004, by F. Craig Farrill, entitled "PRESS-TO-CONNECT (PTC) FOR WIRELESS COMMUNICATIONS SYSTEMS,";

which application is incorporated by reference herein.

This application is a continuation-in-part and claims the benefit under 35 U.S.C. Sections 119, 120 and/or 365 of the following co-pending and commonly-assigned patent applications:

P.C.T. International Patent Application Number PCT/US04/23038, filed Jul. 16, 2004, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 119(e) of U.S. Provisional Patent Application Ser. No. 60/488,638 filed Jul. 18, 2003, Ser. No. 60/492,650 filed Aug. 5, 2003 and Ser. No. 60/576,094 filed Jun. 2, 2004, and which application is a continuation-in-part and claims the benefit under 35 U.S.C. Section 119, 120 and/or 365 of P.C.T. International Patent Application Serial Number PCT/US03/16386, filed May 23, 2003, by Gorachand Kundu, Ravi Ayyasamy and Krishnakant Patel, entitled "DISPATCH SERVICE ARCHITECTURE FRAMEWORK," which application claims the benefit under 35 U.S.C. Section 119(e) of U.S. Provisional Patent Application Ser. No. 60/382,981 filed May 24, 2002, Ser. No. 60/383,179 filed May 24, 2002 and Ser. No. 60/407,168 filed Aug. 30, 2002;

all of which applications are incorporated by reference herein.

This application is related to the following co-pending and commonly-assigned patent applications:

U.S. Utility patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Patent Application Ser. No. 60/573,059 and Ser. No. 60/576,092, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/129,268; and U.S. Utility patent application Ser. No. 11/136,233, filed May 24, 2005, by Krishnakant M. Patel, Vyankatesh Vasant Shanbhag, and Anand Narayanan, entitled "SUBSCRIBER INFORMATION MODULE (SIM) ENABLING ADVANCED VOICE SERVICES (AVS) INCLUDING PUSH TO TALK ON WIRELESS HANDSETS AND NETWORKS,", which application claims the benefit under 35 U.S.C. Section 119(e) of U.S. Provisional Patent Application Ser. No. 60/573,780, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/134,883;

all of which applications are incorporated by reference herein.

BACKGROUND OF THE INVENTION

1. Field of the Invention

This invention relates in general to wireless communications systems, and more specifically, to an advanced voice service known as "Press-to-Connect" for wireless communications systems.

2. Description of Related Art

Advanced voice services (AVS), such as two-way half-duplex voice calls within a group, also known as "Press-to-Talk," "Push-to-Talk," PTT or P2T, have enormous revenue earnings potential for wireless networks, such as cellular networks and personal communications systems (PCS) networks.

Currently, there are three major approaches employed in providing advanced voice services such as P2T in wireless networks. One approach requires the installation of a dedicated private network, parallel to the wireless network, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on GSM (Global System for Mobile Communications) and CDMA (Code Division Multiple Access).

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless networks based on existing standards, such as GSM, CDMA, etc. However, even for the newer standards, solutions based on VoIP have serious drawbacks, including slower call setup, significant overhead, increased susceptibility to packet losses, low bit rate voice coders, and significant modifications to the mobile handset. There is a need, instead, for solutions that require only minimal upgrades to the handset.

Still another approach is that defined in co-pending and commonly-assigned P.C.T. utility patent application Serial Number PCT/US03/16386, filed on May 23, 2003, by Gorachand Kundu, Ravi Ayyasamy, and Krishnakant Patel, entitled DISPATCH SERVICE ARCHITECTURE FRAMEWORK, which application is incorporated by reference herein. In this approach, group-based voice services are provided by a dispatch gateway or real-time exchange that interfaces to the wireless network to provide the group-based voice services therein, wherein both the dispatch gateway and mobiles that use the group-based voice services communicate with each other using call setup and in-band signaling within the wireless network.

Notwithstanding these innovations, there is a need in the art for other advanced voice services that comply with existing and emerging wireless standards and provide superior user experiences. The present invention aims to satisfy this need by providing an advanced voice service known as "Press-to-Connect" for wireless communications systems.

SUMMARY OF THE INVENTION

To overcome the limitations in the prior art described above, and to overcome other limitations that will become apparent upon reading and understanding the present specification, the present invention discloses an advanced voice service known as "Press-to-Connect" for wireless communications systems. A real-time exchange (RTX) interfaces to the wireless network to provide a Press-to-Connect (PTC) call between an initiator and one or more recipients, wherein the PTC call comprises a measured or time-limited Press-to-Talk (P2T) call. The RTX uses a Talk Timer to limit how long the user may press a button and talk (i.e., the Talk Timer limits the length of each continuous "Talk" session of the call), before a "Talk" session of the call in the wireless network is ended, and the RTX uses a Call Timer to limit how long the call can last (i.e., the Call Timer limits the overall length of the call), before the call in the wireless network is ended.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention comprises an advanced voice service (AVS), known as "Press-to-Connect," "Push-to-Connect," PTC or P2C, that extends the "Instant Calling" capabilities of a Real-Time Exchange (RTX) to provide an economical one-to-one wireless network-based push-button call service.

The PTC service can be added to any digital wireless network, including CDMA, GSM, UMTS, and others. Moreover, the PTC service is applicable to all commercial wireless radio frequency bands, and can be applied to any commercial, private, public, military and government radio frequency band in use around the world.

The PTC service can also be delivered across any existing and future brand of wireless infrastructure that employs telecommunications industry standard signaling and transmission standards, such as Signaling System 7 (SS7) and PCM channels such as T1 and E1 digital trunk connections. Currently, wireless infrastructure from suppliers such as Ericsson, Nokia, Motorola, Lucent, Nortel, Siemens and Alcatel can be upgraded by adding the RTX to the core network and connecting the RTX through transmission facilities to the Mobile Switching Centers (MSCs).

In addition, the PTC service can be implemented in digital wireless networks in any part of the world. The technology is applicable to any commercial mobile operator in all seven regions of the globe.

Also, the PTC service can be applied to any manufacturer of wireless handsets across all frequency bands and radio access techniques. It can be applied to single mode, single band handsets up through multi-band, multi-mode handsets capable of global roaming.

Figure 1:
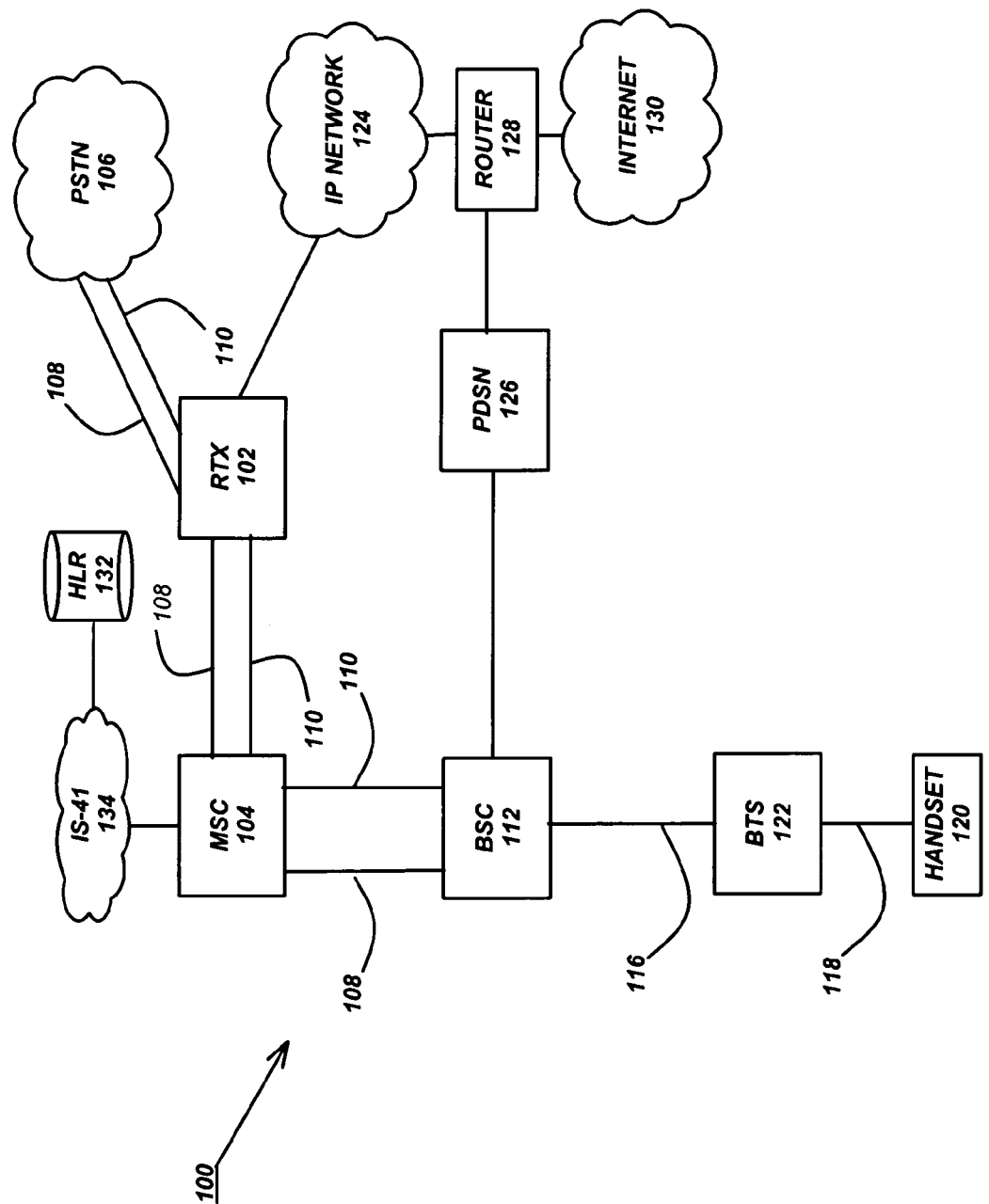
FIG. 1 is a block diagram that illustrates an exemplary embodiment of the dispatch services architecture framework according to a preferred embodiment of the present invention.

The PTC service can be operated simultaneously with other premium voice services over the wireless network. It is anticipated that Premium GSM, Push-to-Talk over Cellular, and PTC will co-exist on the same wireless network, thereby leveraging the capital investment and operating cost Network Architecture FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7-ISUP/WIN/CAMEL (Signaling System 7-Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice codec conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with the mobile handset 120 via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the AVS call request to the RTX 102), the RTX 102 identifies each terminating handset 120 and their MS-ISDN (Mobile Station ISDN Number) number. It sends a ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a handset 120.

Once bearer paths 110 are established for originating and terminating legs for an AVS call, the RTX 102 switches (or duplicates) voice frames from the originating handset 120 to all terminating mobiles 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered mobiles 120. To circumvent this issue, a registration and presence application runs over an IP stack in the handset 120. After the handset 120 registers for a data interface (i.e., obtaining an IP address) with the PDSN 126, the registration and presence application in the handset 120 registers with the RTX 102 using its IP address. The RTX 102 also uses this IP interface to update the presence information of other group members to a handset 120. There is also provision to use SMS (Short Message Service) transport to carry presence messages if an operator chooses to use SMS over a data channel.

During roaming, a Home Location Register (HLR) 132 can be accessed via the MSC 104 and an IS-41 link 134. The HLR 132 can be used to track the presence of members of a group within the network and updates the mobiles 120 for those members with the network availability of other members of the group.

Real Time Exchange

Figure 2:
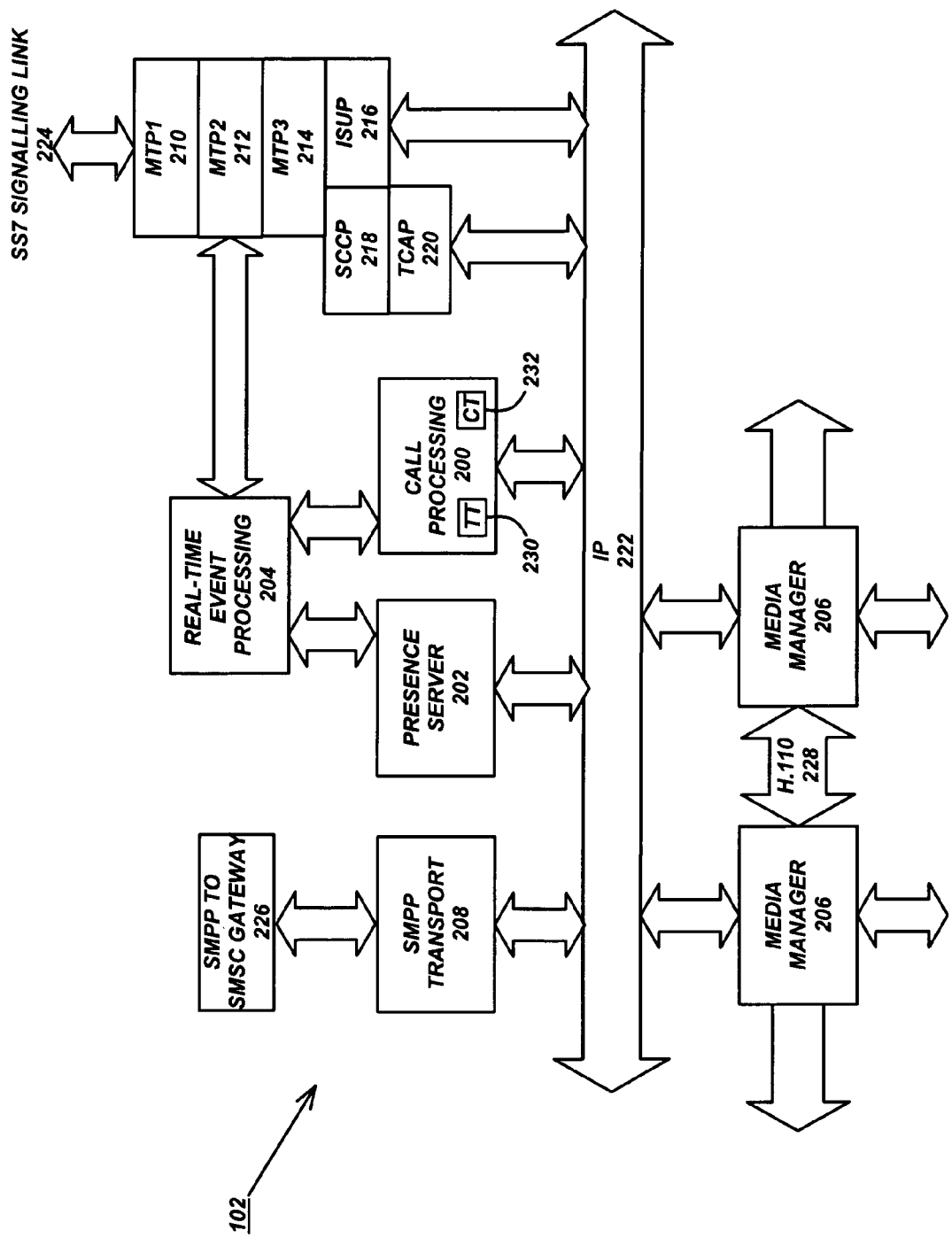
FIG. 2 illustrates a proposed architecture for the real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228.

Press-To-Connect Service

The PTC service provides a low-cost press-to-talk (P2T) only form of wireless communications that can dramatically expand the capacity of existing wireless networks 100. The PTC service allows wireless network 100 operators to provide packages to budget conscious customers with clear limits on call length, and thus offer a service with a monthly price point well below existing cellular service. The PTC service is especially applicable to rapidly growing countries and wireless markets where the average monthly revenue per user is low and the capacity of the underlying wireless network 100 is limited. Moreover, by limiting "Talk Duration" in a call, the PTC service prevents any participants from capturing and holding the floor indefinitely.

In one embodiment, the RTX 102 that interfaces to the wireless network 100 provides the necessary functionality to effect a PTC call between an initiator and one or more recipients, wherein the PTC call comprises a time-limited or measured Press-to-Talk (P2T) call. Two timers are maintained within the Call Processing system 200 of the RTX 102 to enable the time-limited or measured P2T service: a Talk Timer (TT) 230 and a Call Timer (CT) 232.

The RTX 102 uses a variable-length Talk Timer 230 to limit how long a user can talk before a "Talk" session of the call in the wireless network 100 is ended. In other words, the Talk Timer 230 limits how long a user may press a PTC button and talk (i.e., the length of each continuous "Talk" session of the call), before a "Talk" session of the call is ended by the RTX 102. The RTX 102 releases the PTC button (or forces the release of the PTC button) to end one or more Talk sessions of the call.

The RTX 102 also uses a variable-length Call Timer 232 to limit how long the call can last before the call in the wireless network 100 is ended. In other words, the Call Timer 232 limits the number of total seconds a PTC call can last (i.e., the length of the call), before the call is ended by the RTX 102.

In the preferred embodiment, both the Talk Timer 230 and Call Timer 232 are configurable by the wireless network 100 operator. For example, in one embodiment of the present invention, PTC calls may be limited to X seconds for each Talk session (i.e., per press of the PTC button) and Y seconds of total call length. Of course, other values may be used as well.

In alternative embodiments, users may be able to configure different Talk Timer 230 and Call Timer 232 values. Moreover, alternative embodiments may apply the Talk Timer 230 and Call Timer 232 values system wide, or may permit different Talk Timer 230 and Call Timer 232 values for different users, so operators can sell different packages to different market segments.

For each handset 120, the Talk Timer 230 and Call Timer 232 are both activated by the RTX 102 upon call origination. Thereafter, the Talk Timer 230 limits the length of each continuous Talk session of a call and the Call Timer 232 limits the length of the overall call. For example, if the Talk Timer 230 is set at 6 second and the Call Timer 232 is set at 30 seconds, there can be five (5) maximum length continuous Talk sessions before the Call Timer 232 ends the call.

The Talk Timer 230 and Call Timer 232 values are stored in the RTX 102 on a per handset 120 or on a per user basis, with each handset 120 or user having unique PTC service parameters. The RTX 102 enables multiple Talk Timers 230 and Call Timers 232 within the same network 102.

Limiting the talk time and call time in this manner reduces the variation or standard deviation of radio traffic channel occupancy. By encouraging PTC users to keep their talk sessions short, the capacity of the underlying wireless network 100 is significantly expanded. Completing more calls over the same infrastructure also expands the overall call-carrying capacity of the network 100 and enables the operator to effectively increase the call-carrying capacity of the entire network 100 without additional capital investment.

Press-To-Connect Call State Diagram

Figure 3:
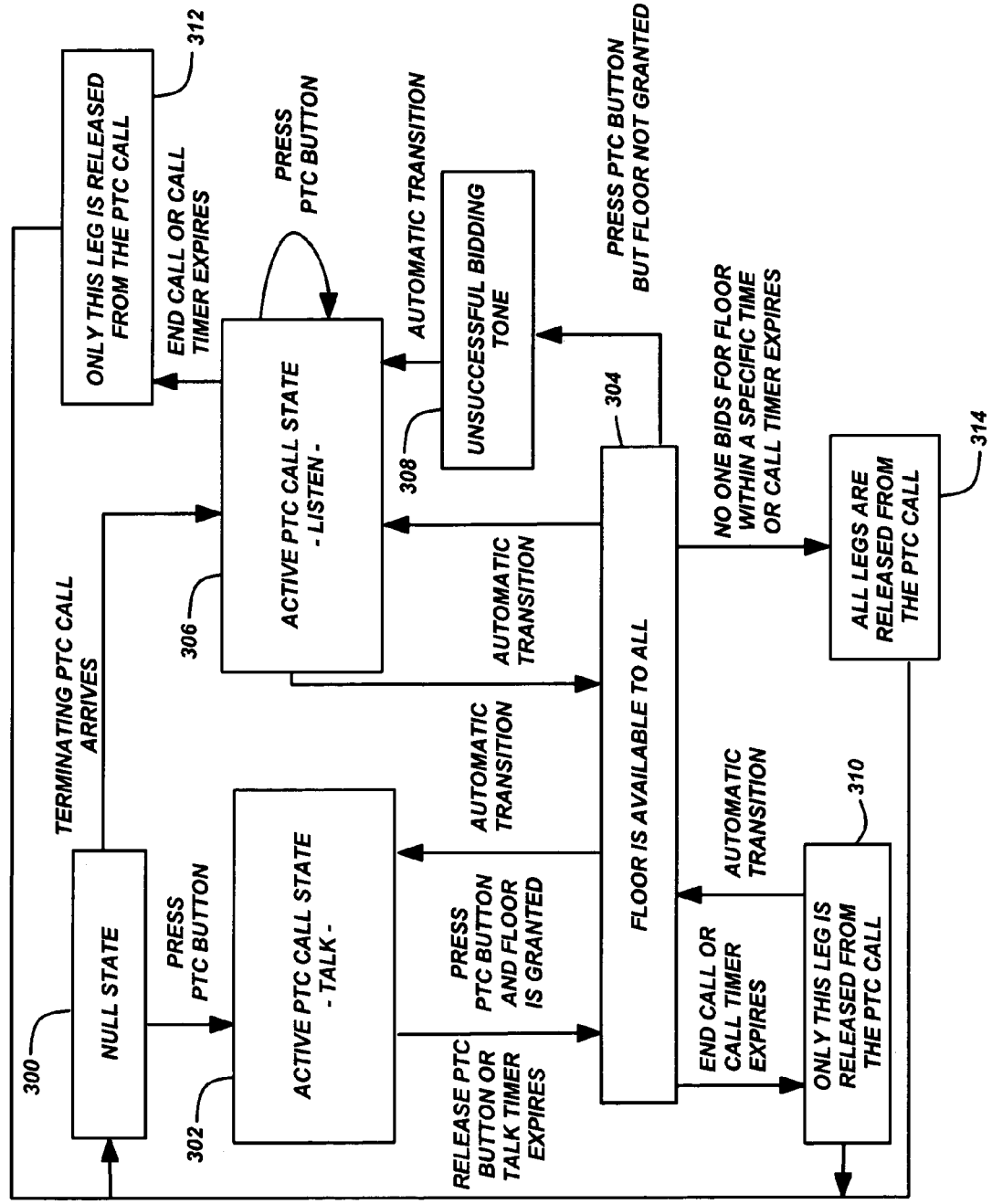
FIG. 3 is a state diagram that illustrates the operation of a "Press-to-Connect" call according to a preferred embodiment of the present invention.

FIG. 3 is a state diagram that illustrates the operation of a PTC call according to a preferred embodiment of the present invention. Specifically, the Call Processing system 200 and Real-Time Event Processing system 204 of the RTX 102 perform a method of providing advanced voice services in a wireless network, by using a Talk Timer to limit how long a user can talk before a "Talk" session of a call in the wireless network is ended, and by using a Call Timer to limit how long the call can last before the call in the wireless network is ended.

State 300 represents a mobile handset 120 in a NULL state, i.e., the start of the logic. A user pressing a PTC button or the arrival of a terminating PTC call triggers a transition out of this state.

State 302 represents a mobile handset 120 in an active PTC call state. In this state, the user receives a chirp tone that signals the user to start talking. The user responds by pressing the PTC button on the mobile handset 120 and talking. The mobile handset 120 ensures that only when the user presses the PTC button is the reverse traffic channel used to send voice frames, and the RTX 102 switches voice frames only in one direction, i.e., from talker to listener, which ensures the half-duplex operation required for a PTC call. A transition occurs to State 304 when the user releases the PTC button or the Talk Timer 230 expires.

State 304 represents the "floor" being available to all members of the call, which occurs when the talking user releases the PTC button. Upon entry into this state, all members of the call receive a "free floor" tone on their mobile handset 120. A user who requests the floor by pressing the PTC button first (in the "free-floor" state) is assigned the floor, wherein the network 100 sends a chirp tone to the successful user, and a transition to State 302 occurs. An unsuccessful request for the floor results in a transition to State 306. A transition to State 310 occurs when the call is ended, either manually by the user, or automatically by the RTX 102 upon expiration of the Call Timer 232. A transition to State 314 occurs when no one bids for the floor within a specific time, or upon expiration of the Call Timer 232.

State 306 represents a mobile handset 120 being in an active PTC call state. In this state, the user is listening to the PTC call. If a non-talking user presses the PTC button in a call active state, the user does not receive any response from the network 100 and remains in the same functional state. A transition to State 312 occurs when the call is ended, either manually by the user or automatically by the RTX 102 upon expiration of the Call Timer 232.

Note, however, that alternative embodiments may implement a concept known as Leadership Floor Control (LFC), where an originator can seize the floor at any time, regardless of the current floor assignment. In such embodiments, LFC may or may not have precedence over the Talk Timer 230.

State 308 represents a user receiving an "unsuccessful bidding" tone on his mobile handset 120, after the user pressed the PTC button, but was not granted the floor of the call. The user subsequently starts listening to the voice message of the talking user.

Non-talking users (including the talking user who must release the PTC button to make the floor available for others) can request the network 100 to end their respective call legs explicitly.

State 310 represents a terminating leg being released from the call when the call is ended, either manually by the user or automatically by the RTX 102 upon expiration of the Call Timer 232.

State 312 also represents a terminating leg being released from the call when the call is ended, either manually by the user or automatically by the RTX 102 upon expiration of the Call Timer 232.

State 314 represents all terminating legs being released from the call when no member of the group bids for the floor within a specified time period (i.e., upon expiration of a configurable "Hang Timer"), or upon expiration of the Call Timer 232. Note that the Hang Timer may or may not override the Call Timer 232 in the event of non-acquisition of floor by one the participants.

Additional Aspects of Press-To-Connect

The PTC service is a separate class of service that is identified by a different set of incoming dialed digits to the RTX 102, so that the RTX 102 can properly route and process the PTC calls.

The PTC service need not be implemented in an RTX 102. For example, the PTC service could be implemented in an MSC 104.

The PTC service can coexist with other advanced voice services provided by the wireless network 100. The wireless network 100 operator can, at its discretion, offer PTC on a stand-alone basis, or in combination with Press-to-Talk (PTT), Press-to-Conference (P2C), Upgrade to Conference, Press-to-Message (P2M), etc.

The handsets 120 may have dedicated PTC buttons or may have buttons that share the PTC function with other functions. For example, the P2T button on a handset 120 may operate as the PTC button.

In one embodiment, handsets 120 contain a client application that enables the handset 120 to properly interact with the RTX 102 over the wireless network 100. The client application can be installed at the factory, distribution point, point of sale or in some cases, downloaded over the air. The client application can also be added to the handset 120 through a subscriber identity module (SIM) or similar component.

PTC calls may have variable voice quality options. In such embodiments, the customer can select full rate or half rate encoding and the resulting voice quality is delivered on each call. Voice quality is configurable by the wireless network 100 operator on a per customer basis.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing advanced voice services in a wireless network, comprising:

a mobile phone network for making calls between mobile phones, wherein the calls are initiated by call setup and in-band signaling within the mobile phone network and voice frames for the calls are routed between the mobile phones through at least one mobile switching center and across bearer paths in the mobile phone network; and a real-time exchange that interfaces to at least one mobile switching center in the mobile phone network to provide the advanced voice services therein, the advanced voice services including a capability to make a Press-to-Connect (PTC) call between an initiator mobile phone and one or more recipient mobile phones within the mobile phone network, wherein the PTC call comprises a time-limited Press-to-Talk (P2T) call having a duration controlled by the real-time exchange, both the real-time exchange and the mobile phones that use the PTC call communicate with each other using the call setup and in-band signaling within the mobile phone network, and the real-time exchange switches the voice frames for the PTC call between the initiator mobile phone and the recipient mobile phones across the bearer paths and through at least one mobile switching center in the mobile phone network.

2. The apparatus of claim 1, wherein the real-time exchange uses a Talk Timer to limit how long a user can talk before a "Talk" session of the call in the mobile phone network is ended, and the real-time exchange uses a Call Timer to limit how long the call can last before the call in the mobile phone network is ended.

3. The apparatus of claim 2, wherein the Talk Timer limits how long the user may press a button and talk before the "Talk" session of the call is ended.

4. The apparatus of claim 2, wherein the Talk Timer limits the length of each continuous "Talk" session of the call.

5. The apparatus of claim 2, wherein the Call Timer limits the length of the call.

6. The apparatus of claim 2, wherein the Talk Timer and Call Timer are activated upon call origination.

7. The apparatus of claim 2, wherein the Talk Timer and Call Timer are stored on a per handset or on a per user basis.

8. The apparatus of claim 2, wherein the Talk Timer and Call Timer are configurable.

9. A method of providing advanced voice services in a wireless network, comprising:
communicating between mobile phones and a mobile phone network in order to make calls between the mobiles, wherein the calls are initiated by call setup and in-band signaling within the mobile phone network and voice frames for the calls are routed between the mobile phones through at least one mobile switching center and across bearer paths in the mobile phone network; and
switching the voice frames for the advanced voice services in a real-time exchange that interfaces to at least one mobile switching center in the mobile phone network to provide the advanced voice services therein, the advanced voice services including a capability to make a Press-to-Connect (PTC) call between an initiator mobile phone and one or more recipient mobile phones within the mobile phone network, wherein the PTC call comprises a time-limited Press-to-Talk (P2T) call having a duration controlled by the real-time exchange, both the real-time exchange and the mobile phones that use the PTC call communicate with each other using the call setup and in-band signaling within the mobile phone network, and the real-time exchange switches the voice frames for the PTC call between the initiator mobile phone and the recipient mobile phones across the bearer paths and through at least one mobile switching center in the mobile phone network.

10. The method of claim 9, wherein the real-time exchange uses a Talk Timer to limit how long a user can talk before a "Talk" session of a call in the mobile phone network is ended, and the real-time exchange uses a Call Timer to limit how long the call can last before the call in the mobile phone network is ended.

11. The method of claim 10, wherein the call is a Press-to-Connect (PTC) call between an initiator and one or more recipients, and the PTC call comprises a time-limited Press-to-Talk (P2T) call.

12. The method of claim 10, wherein the Talk Timer limits how long the user may press a button and talk before the "Talk" session of the call is ended.

13. The method of claim 10, wherein the Talk Timer limits the length of each continuous "Talk" session of the call.

14. The method of claim 10, wherein the Call Timer limits the length of the call.

15. The method of claim 10, wherein the Talk Timer and Call Timer are activated upon call origination.

16. The method of claim 10, wherein the Talk Timer and Call Timer are stored on a per handset or on a per user basis.

* * * * *